R. P. VAN CALCAR, J. ELLERMAN & H. J. MARTIJN.
TREATING AND SIMULTANEOUSLY STERILIZING OF AIR.
APPLICATION FILED MAR. 15, 1913.
1,215,222.
Patented Feb. 6, 1917.
4 SHEETS—SHEET 2.
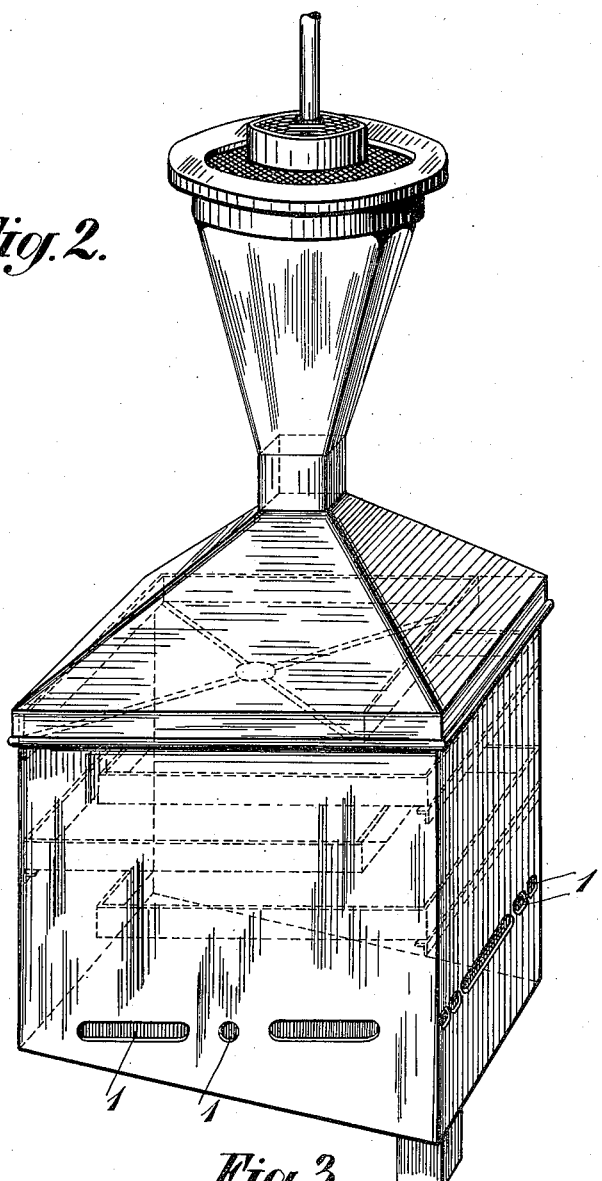
Fig. 2.
Fig. 3.
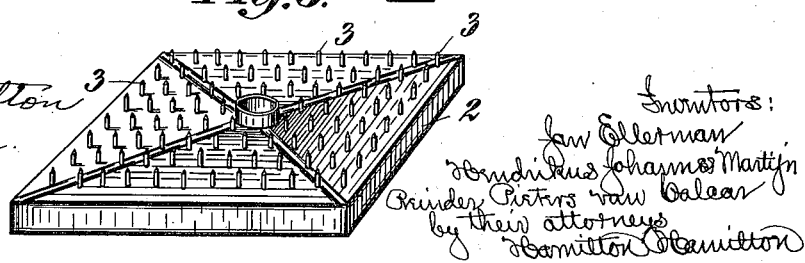

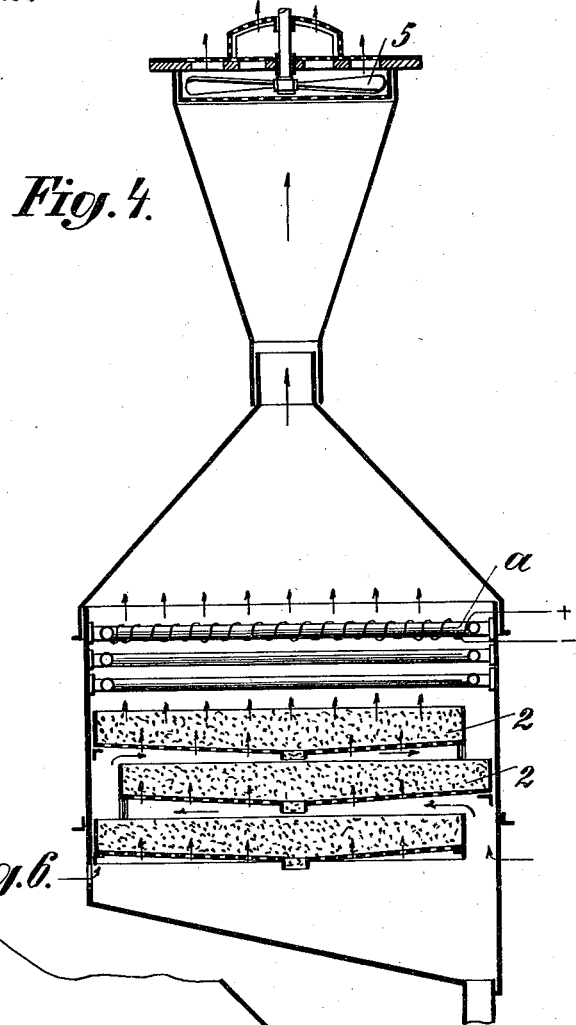
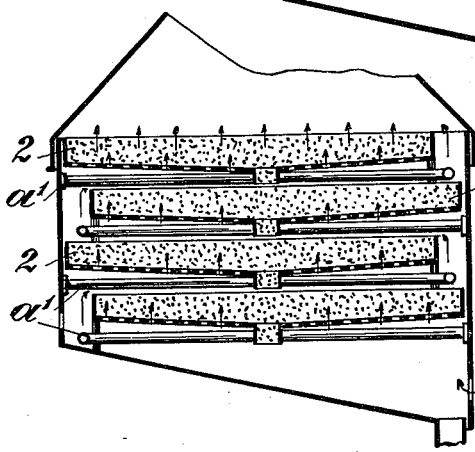
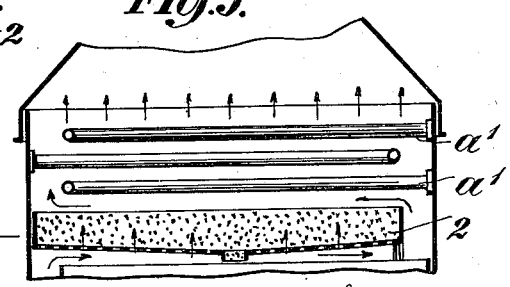

R. P. VAN CALCAR, J. ELLERMAN & H. J. MARTIJN.
TREATING AND SIMULTANEOUSLY STERILIZING OF AIR.
APPLICATION FILED MAR. 15, 1913.
1,215,222.
Patented Feb. 6, 1917
4 SHEETS—SHEET 4.
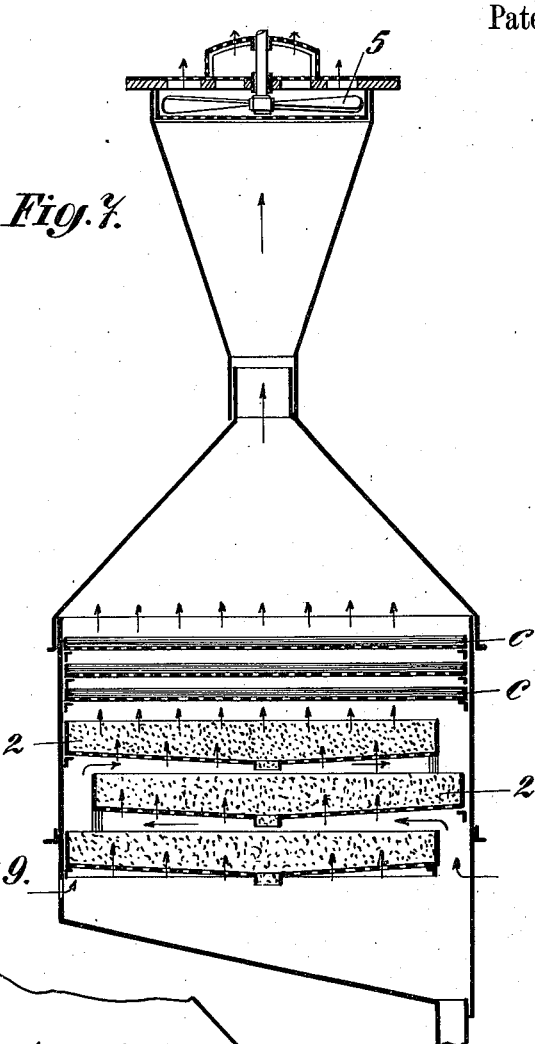
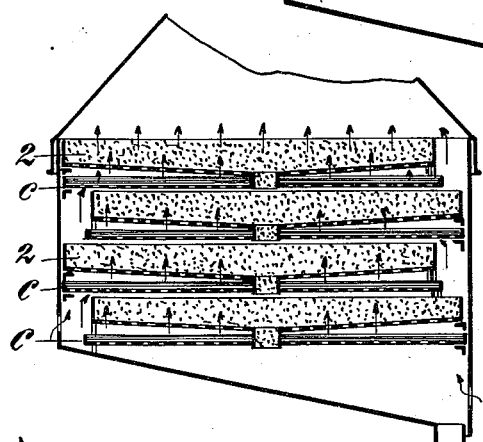
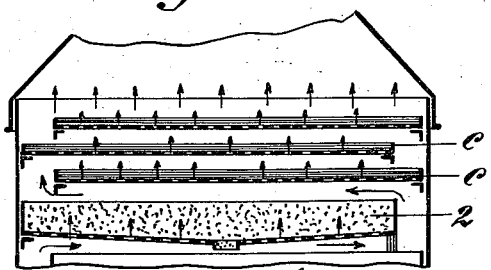

UNITED STATES PATENT OFFICE.

REINDER PIETERS VAN CALCAR, OF OEGSTGEEST, AND JAN ELLERMAN AND HENDRIKUS JOHANNES MARTIJN, OF THE HAGUE, NETHERLANDS.

TREATING AND SIMULTANEOUSLY STERILIZING OF AIR.

1,215,222.  Specification of Letters Patent.  Patented Feb. 6, 1917.

Application filed March 15, 1913. Serial No. 754,446.

*To all whom it may concern:*

Be it known that we, REINDER PIETERS VAN CALCAR, professor, JAN ELLERMAN, banker, and HENDRIKUS JOHANNES MARTIJN, banker, residing, the former in the city of Oegstgeest, in the Kingdom of the Netherlands, and the latter two in the city of The Hague, in the Kingdom of the Netherlands, have invented certain new and useful Improvements in the Treating and Simultaneously Sterilizing of Air, of which the following is a specification.

The present invention relates to improvements in the treating and simultaneously sterilizing of air, especially of moist and cold or moist and warm air.

It has been found that all means and methods suggested and used hitherto for the treatment of air, for the purpose of drying and simultaneously sterilizing air have not led to a thorough result and to a complete removal of moisture contained in the air, and also not to a perfect sterilization of same.

It is to be observed that heretofore all endeavors to build an apparatus adapted to have in a complete and satisfactory manner an air-drying and sterilizing action have been without decisive effect. More particularly persons engaged in the silk industry have complained of the want of an apparatus with which satisfactory results could be obtained. Now, due to a long sequence of practical and scientific trials, it has been ascertained that, by the aid of the process (or, as the case may be, of the apparatus) hereinafter described, an absolutely reliable and perfect drying and sterilizing effect can be attained. As an absorbing agent, chlorid of calcium (or a mixture thereof with other salts) can be made use of.

The present improvement has for its object to provide for a most intimate interaction of the air to be dried and sterilized with the absorbing agent, with a view to have the drying and sterilizing process carried on more promptly and to increase the intensity of the drying and sterilizing effect.

In the drawings illustrating the principle of this invention and the best mode now known to us of applying that principle, Figure 1 is a vertical section through the apparatus provided with the baffles at the bottoms of the pans.

Fig. 2 is a perspective view showing square apparatus with the peculiarly arranged apertures in three wall-sides.

Fig. 3 shows in perspective one form of construction of the underside of the pan for holding the absorbing agent.

Fig. 4 is a vertical section through an apparatus for treating cold and moist air in which the heating devices are arranged above the drying apparatus and extend over the whole width of the latter.

Fig. 5 is a fragmentary vertical section through an apparatus in which the several heating elements are shown arranged in staggered relation.

Fig. 6 is a fragmentary vertical section through an apparatus in which the several heating elements are shown arranged between the pans containing the drying agent.

Fig. 7 is a vertical section through an apparatus for treating warm and moist air in which the cooling pans are shown arranged above the drying apparatus and extend through the whole width of the latter.

Fig. 8 is a similar section through the apparatus in which the several cooling pans are shown arranged in staggered relation.

Fig. 9 is a fragmentary vertical section through an apparatus in which the cooling pans are shown arranged between the pans containing the drying agent.

Figure 1:
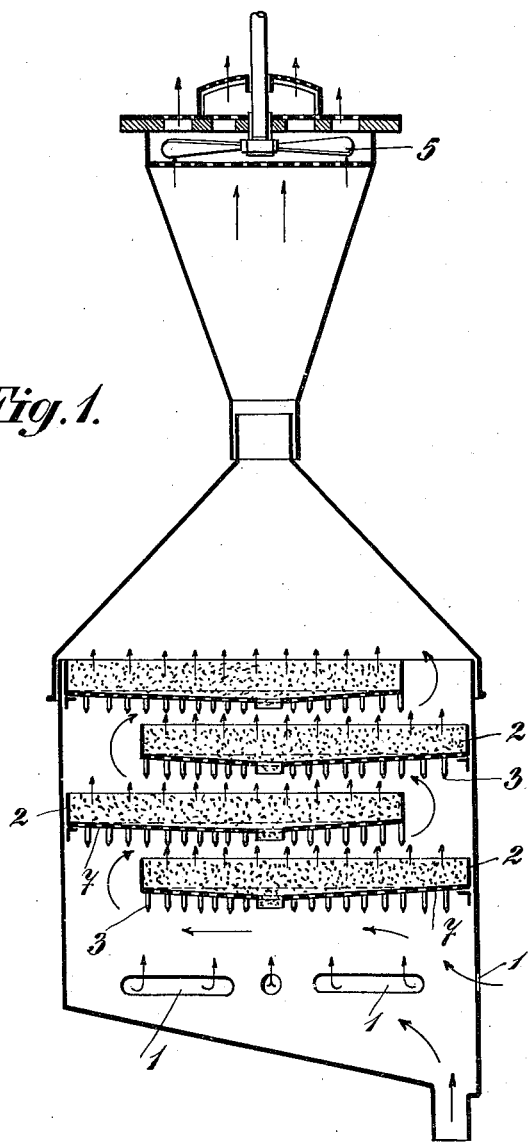

This object is attained in such a way that

1°, a strong whirling motion is artificially imparted to the air;

2°, the surfaces of contact between the dust-particles of the air to be dried and sterilized and the particles of humidity thereof on the one hand and the outflowing masses of the absorbing agent on the other hand are made as large as possible, the air, while passing by the outflowing masses of the absorbing agent, being subjected to a further, continuous and uninterrupted whirling motion.

The first or preliminary whirling motion of the air is insured by the peculiar construction of the apparatus.

This is given a square form, so that an aspiration of air takes place only on three sides of the square casing, while the fourth casing-wall is entirely imperforate and has no exit-apertures at all for the air. The apertures are so arranged for the following reasons. Had apertures been provided in this side of the casing, the ventilator would meet here with the least resistance due to the open space by the side of the lowermost pan, and, when started up, the ventilator would exhaust the whole amount of air and no whirling motion of the air would rise. Further the air-exit apertures are so arranged that the openings, opposite to the unperforated casing-wall are larger than those in the side-walls.

The openings in the two side walls are so arranged that between the two oval apertures there is a smaller aperture, as seen in Figs. 1 and 2, while at the front side of the apparatus there is a long oval opening at each side of which are two small openings, as seen in Fig. 2.

Trials have shown that under simultaneous artificial aspiration of air it is precisely owing to this effect of the apertures that an intense whirling motion of the air is produced.

At the upper end of the apparatus there is provided, as described in our pending application Serial No. 668474 an exhauster which, due to its aspirating effect, causes the formation of the whirl.

The surfaces of contact between the dust particles and the particles of humidity of the air on the one hand and the outflowing absorbing agent on the other hand are increased by providing at the lower bottom space of the pans, described in our pending application Serial No. 668474 and containing the absorbing means, a large number of baffles in the form of vertically arranged pins along which the absorbing substance, flowing off due to the absorbed humidity of the air, run down. These baffles, pins, or their equivalents are so arranged that the traversing air, which has already undergone a first whirling motion, is compelled to pass these obstacles, which are arranged in vertical downward direction, either alternately or in other curves of the bottom-side of each of the superposed pans, placed in alternation.

A further object of the present invention consists in the treatment especially of moist and cold or moist and warm air.

It is a well known fact that moist and cold air produces the sensation of being colder than dry air of the same temperature, while moist and warm air appears to be warmer than dry air of the same temperature. The moisture in the air is detrimental to health as it considerably reduces the ability of the human body to conduct heat. It is therefore very important from a sanitary point of view to be able to regulate the percentage of moisture contained in the air and to raise or lower at the same time the temperature of the air and to obtain a perfect sterilization of the same.

In practically all climates, more especially in the tropical and sub-tropical climates, the question of removing the moisture and at the same time raising or lowering the temperature is one of vital importance.

The subject of the present invention is a method of treating the air in the above described manner, which method is a further development of the subject matter of our pending application Serial No. 668,474 and of our Patent No. 1,067,693; inasmuch as the dry preliminary treatment of the cold or warm moist air produces simultaneously a sterilizing action.

This object is obtained by subjecting the air first to a preliminary treatment, namely to a drying process in the manner described in our pending application which may at the same time be a process of sterilization, and thereafter subjecting the air to a further treatment, the nature of which depends on the temperature of the air treated, and is different in the case of cold and moist air from that used in the case of moist and warm air.

1. *Treating of cold and moist air.*—The air is first subjected to a preliminary treatment, namely a drying process which may be carried out in the manner described in our pending application, by passing the air over suitable chemical substances, for instance calcium chlorid. Instead of calcium chlorid other known suitable absorbing means or mixtures of the same may be employed.

The air thus preliminarily treated is passed over a suitable source of heat and is raised to the required temperature.

While the air is subjected to the described preliminary and final treatments, it is also subjected simultaneously to an intense suction action whereby it is brought into intimate contact with the drying agent (calcium chlorid) and the heating apparatus.

2. *Treating of warm and moist air.*—For the purpose of removing the moisture contained in warm air, a preliminary treatment of the air takes place as above mentioned, the air being dried in the described manner. Before or after this drying operation the air is passed over substances which are suitable for producing a considerable cooling of the air, for instance a mixture of calcium chlorid and ice. In this case too the air is subjected to an intense suction action for the above mentioned purpose of bringing the air into intimate contact with the cooling means.

The treatment of the moist and cold or the moist and warm air may be carried out by the method and device described in our application Serial No. 668,474 and our said Patent No. 1,067,693 and also by means of the devices hereafter specified.

The apparatus is put up in a closed room, as in a sick-room, class-room, department-store, factory shed, etc., and after the pans have taken up the absorbing agent, the exhauster 5, fitted at the top end of the apparatus, is started; the pans have gauze-covered bottoms.

The air-whirl, created in the lower part of the apparatus, is increased, and the air, drawn through the apertures 1 rises upwardly through the apparatus and through the pans 2 and above the same, the air then being compelled to pass by the baffles 3, directed in a vertical downward direction.

Meanwhile, owing to the humidity of the air, caused by the absorbing agent, this agent flows down along the baffles, and the air drawn upwardly is on the one hand brought in sinuous or zig-zag lines into close contact with the downwardly trickling absorbing agent so as to be subjected to a fresh, continued and uninterrupted whirling motion; on the other hand it passes through the reticulated bottoms 7 of the pans, carrying the absorbing agent. Due to the vertically arranged drip-pans 3 a much more intense drying or, as the case may be sterilizing is realized as, in the first instance, the absorbing surface is much enlarged and secondly absorption is effected at the drip pans 3 in the more intensely acting vertical direction rather than in tangential direction.

The apparatus shown in Figs. 4 and 7 is substantially similar to that described in our said Patent No. 1,067,693. The same consists of a number of pans (2) made of wire gauze or similar material and if desired arranged in staggered relation to each other. These pans contain a suitable drying agent for the purpose of the preliminary drying and simultaneous sterilizing of the air.

The current of air which is passed through the apparatus may be induced or strengthened by the arrangement of an electrically or otherwise driven ventilator or exhaust-fan (5).

For the purpose of treating cold and moist air suitable heating devices are mounted within the apparatus at suitable points. For instance an electrically heated apparatus (a) as shown in Fig. 4 may be arranged above the uppermost pan (2), which heats the preliminarily dried and in most cases also sterilized air. This heating device (a) may either as shown in Fig. 4 extend along the whole width of the drying apparatus, or the several elements of the same may be arranged in staggered relation as shown in Fig. 5. The several heating elements a' may also be arranged between the drying pans as shown in Fig. 6 so that the cold and moist air is subjected to a gradual and continuous heating. The elements of the heating apparatus may be heated in any suitable manner instead of being heated by electricity.

For treating warm and moist air, pans (c) are arranged at suitable points of the apparatus described in our pending application, Serial No. 668,474, these pans containing as mentioned a mixture of a chemical substance and ice.

These pans (c) are preferably superposed so that the warm and moist air is subjected during its passage to a repeated cooling process.

The arrangement of the pans (c) may be either such that the pans occupy the whole inner width of the apparatus as shown in Fig. 7, or the pans may be arranged in staggered relation so as to cause the air to be cooled to pass between the pans in a serpentine line, as shown in Fig. 8. The cooling pans may also be arranged between the drying pans as shown in Fig. 9.

Experiments have proved that the air treated in this manner is not only almost absolutely sterilized, but is quite dry and leaves the apparatus free from cold or hot moisture.

For the practical application of the invention an apparatus of the described kind is fitted up in the room in which it is desired to produce a separation of the cold and moist or warm and moist air. The invention may be employed particularly in connection with living rooms, hospitals, schools, halls, magazines, etc., and similar rooms. The pans 2 are filled with the described chemicals and the ventilator or exhaust fan 5 is connected to a suitable source of energy for the purpose of inducing or increasing the draft.

It may be noted that in spite of the fact that the air is subjected to a heating or cooling process as desired, there will be practically no cooling of the hot air and no heating of the cold air, owing to the simultaneous ventilating action. The air remains substantially at this natural temperature and the heating and cooling processes are carried only so far as to remove the detrimental moisture of the air, while retaining the natural temperature of the air and obtaining a sterilization of the same. The particular constitution of the air and its various hygienic qualities are in no way affected by the present method.

Having thus described our invention what we claim as new and desire to secure by Letters Patent is as follows:

1. A process for drying and sterilizing air, which consists in subjecting the air to an artificial whirling motion in the lower part of an apparatus, interposing an absorbing agent in the path of said air, then subjecting the air to a further treatment causing the absorbing agent to flow out by reason of the absorbed humidity of the air, and enlarging the surface contact between the dust particles and the particles of moisture, compelling the air to ascend in a zig-zag course past the outflowing absorptive agent and on the other hand to traverse the absorbing agent whereby the air is subjected to a continuous and uninterrupted complementary whirling motion.

2. An apparatus of the character described comprising the combination with a suction device of a square casing having air-inlet apertures formed in three sides, the fourth side being left imperforate; and pans arranged in said casing above said air-inlet apertures.

3. An apparatus of the character described comprising the combination with a suction device of a square casing formed with air-inlet apertures in three sides, the fourth side of the casing being substantially imperforate; said air-inlet apertures varying in size to produce air-currents of different intensities.

4. An apparatus of the character described comprising the combination of a square casing having pans built therein and provided with downwardly-directed baffles mounted at the bottom of the pan; said casing being formed with air-inlet passages on three of its sides below the pan, while the fourth side of the casing is substantially imperforate.

5. A process for treating air which consists in drying and sterilizing the air to remove the moisture therefrom, subjecting the air to a continuous and uninterrupted whirling motion and changing the temperature of said air to a degree to remove therefrom the detrimental moisture leaving unaltered the constituent and hygienic properties of the air and increasing the surfaces of contact between the dust particles and the particles of humidity of the air on the one hand and the outflowing absorbing agent on the other hand and giving it a circuitous motion.

6. In an apparatus of the character described, the combination with a suction device, of a casing, pans mounted therein and containing a drying agent, temperature changing devices, said casing being provided with draft devices and means for inducing air currents of different intensities.

In testimony whereof we have affixed our signatures in presence of two witnesses.

REINDER PIETERS van CALCAR.
JAN ELLERMAN.
HENDRIKUS JOHANNES MARTIJN.

Witnesses:
IAC. J. G. HALLE,
J. D. THOP.